United States Patent
Bin Redhwan et al.

(10) Patent No.: US 12,543,034 B2
(45) Date of Patent: Feb. 3, 2026

(54) RESTRICTION OF NUMBER OF PSCells IN MHI REPORT

(71) Applicant: Telefonaktiebolaget LM Ericsson (publ), Stockholm (SE)

(72) Inventors: Sakib Bin Redhwan, Linköping (SE); Angelo Centonza, Granada (ES); Kristina Zetterberg, Linköping (SE); Julien Muller, Rennes (FR); Pradeepa Ramachandra, Linköping (SE); Ali Parichehrehteroujeni, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 18/552,543

(22) PCT Filed: Mar. 31, 2022

(86) PCT No.: PCT/IB2022/053023
§ 371 (c)(1),
(2) Date: Sep. 26, 2023

(87) PCT Pub. No.: WO2022/208434
PCT Pub. Date: Oct. 6, 2022

(65) Prior Publication Data
US 2024/0121593 A1  Apr. 11, 2024

Related U.S. Application Data

(60) Provisional application No. 63/168,600, filed on Mar. 31, 2021.

(51) Int. Cl.
*H04W 8/18* (2009.01)
*H04W 36/00* (2009.01)
(Continued)

(52) U.S. Cl.
CPC ... *H04W 8/183* (2013.01); *H04W 36/008375* (2023.05); *H04W 36/08* (2013.01); *H04W 48/08* (2013.01)

(58) Field of Classification Search
None
See application file for complete search history.

(56) References Cited

U.S. PATENT DOCUMENTS

2014/0206361 A1  7/2014  Centonza et al.
2022/0167215 A1*  5/2022  Hu ........................ H04W 24/10

FOREIGN PATENT DOCUMENTS

WO  2014021761 A2  2/2014
WO  2021026852 A1  2/2021
WO  2022079635 A1  4/2022

OTHER PUBLICATIONS

Huawei, et al., "R2-2007769: Discussion for RAN2 Son scope and requirements," 3GPP TSG-RAN WG2 Meeting #111, Aug. 17-28, 2020, Electronic Meeting, 9 pages.
(Continued)

*Primary Examiner* — Robert M Morlan
(74) *Attorney, Agent, or Firm* — Withrow & Terranova, PLLC

(57) ABSTRACT

Systems and methods for restricting a number of primary secondary cells (or primary cells in a secondary cell group) (PSCells) in a Mobility History Information (MHI) managed by a wireless device are disclosed. In some embodiments, a method performed by the wireless device for restricting a number of stored PSCells in MHI comprises storing PSCell history information in memory of the wireless device for a maximum number of PSCells. The PSCell history information is part of MHI stored for the wireless device. In response to the number of PSCells exceeding the maximum number of PSCells, the method further comprises removing
(Continued)

at least some of the stored PSCell history information from the memory of the wireless device.

20 Claims, 8 Drawing Sheets

(51) Int. Cl.
*H04W 36/08* (2009.01)
*H04W 48/08* (2009.01)

(56) References Cited

OTHER PUBLICATIONS

Decision to Grant for Japanese Patent Application No. 2023-522367, mailed Sep. 3, 2024, 5 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Technical Specification 36.300, Version 16.0.0, Dec. 2019, 3GPP Organizational Partners, 366 pages.
Author Unknown, "Technical Specification Group Radio Access Network; Evolved Universal Terrestrial Radio Access (E-UTRA); Radio Resource Control (RRC); Protocol specification," Technical Specification 36.331, Version 16.4.0, Mar. 2021, 3GPP Organizational Partners, 1,087 pages.
Author Unknown, "Technical Specification Group Radio Access Network; NR; Radio Resource Control (RRC) protocol specification (Release 16)," Technical Specification 38.331, Version 16.4.0, Mar. 2021, 3GPP Organizational Partners, 949 pages.
Author Unknown, "Technical Specification Group Radio Access Network; NG-RAN; Architecture description (Release 16)," Technical Specification 38.401, Version 16.4.0, Jan. 2021, 3GPP Organizational Partners, 78 pages.
CATT, "R2-2100194: Enhancement on Mobility History Information," 3GPP TSG RAN WG2#113-e, Jan. 25-Feb. 5, 2021, Electronic Meeting, 4 pages.
CATT, "R3-197148: Enhancement of UE history information," 3GPP TSG-RAN WG3 Meeting #106, Nov. 18-22, 2019, Reno, Nevada, 3 pages.
Ericsson, "Tdoc R2-1915753: Mobility History Information Reporting from the UE," 3GPP TSG-RAN WG2#108, Nov. 18-22, 2019, Reno, Nevada, 5 pages.
Ericsson, "R2-2201605: On Other WID related SON features," 3GPP TSG-RAN WG2 #116bis-e, Jan. 17-25, 2022, Electronic Meeting, 13 pages.
Ericsson, "R3-206510: (TP for SON BL CR for TS 36.413/38.413/36.423): UE History Information for Secondary Node," 3GPP TSG-RAN WG3 #110-e, Nov. 2-12, 2020, Electronic Meeting, 13 pages.
Huawei, "R3-204936: UE history information in EN-DC," 3GPP TSG-RAN WG3 #109-e, Aug. 17-28, 2020, Electronic Meeting, 4 pages.
International Search Report and Written Opinion for International Patent Application No. PCT/IB2021/059414, mailed Jan. 14, 2022, 12 pages.
International Search Report and Written Opinion for International Patent Application No. PCT/IB2022/053023, mailed Jun. 29, 2022, 20 pages.
Written Opinion for International Patent Application No. PCT/IB2022/053023, mailed Feb. 23, 2023, 12 pages.
International Preliminary Report on Patentability for International Patent Application No. PCT/IB2022/053023, mailed Jun. 30, 2023, 32 pages.
3GPP TS 38.331 V16.2.0 (Sep. 2020), 3rd Generation Partnership Project; Technical Specification Group Radio Access Network; NR; Radio Resource Control (RRC) protocol specification (Release 16), Sep. 2020. pp. 198, 752-753, 826.
Huawei, HiSilicon, Discussion for RAN2 Son scope and requirements, 3GPP TSG RAN WG2 #111-e R2-2007769, Aug. 17-28, 2020.

* cited by examiner

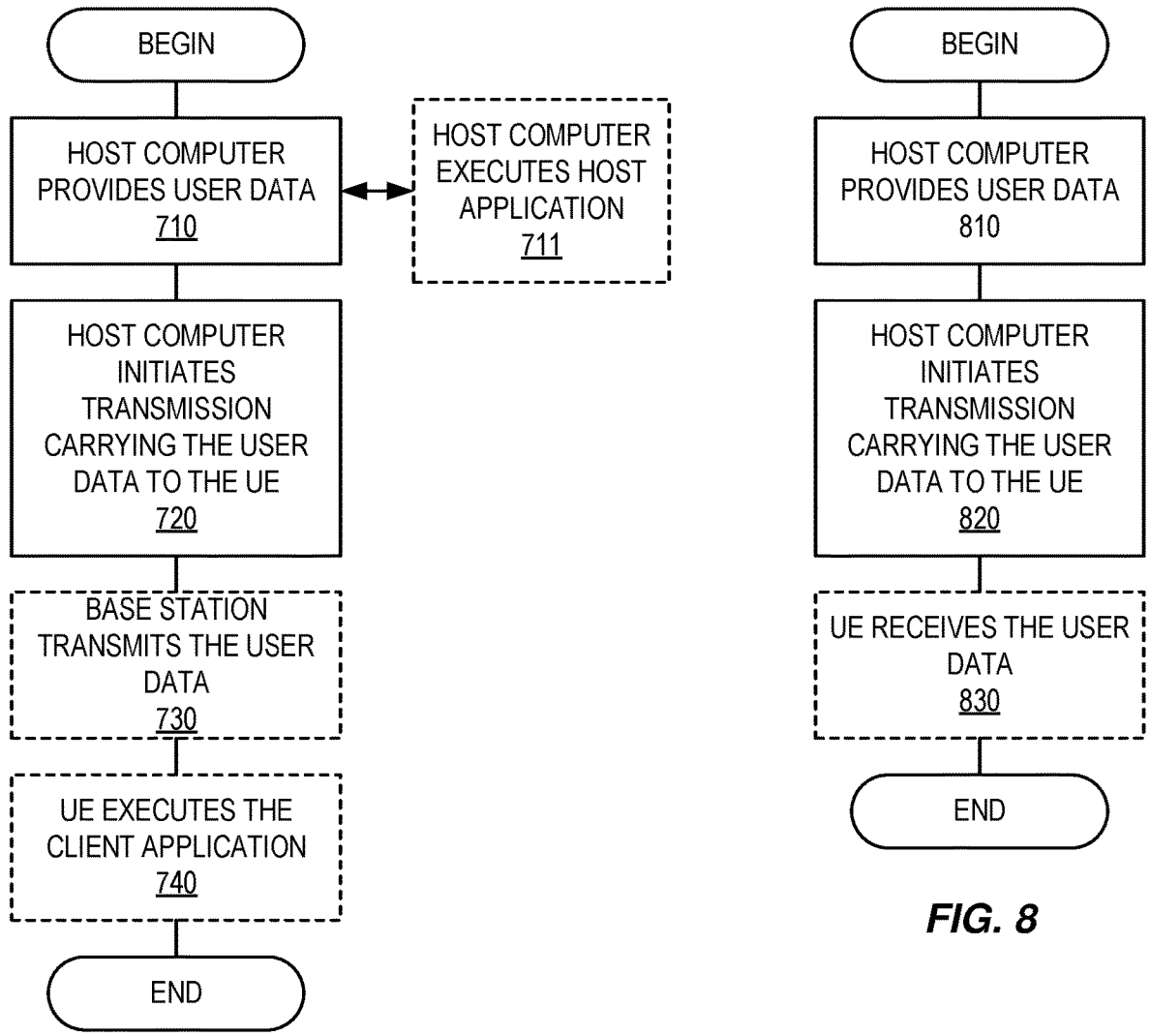

RESTRICTION OF NUMBER OF PSCells IN MHI REPORT

RELATED APPLICATIONS

This application is a 35 U.S.C. § 371 national phase filing of International Application No. PCT/IB2022/053023, filed Mar. 31, 2022, which claims the benefit of provisional patent application Ser. No. 63/168,600, filed Mar. 31, 2021, the disclosures of which are hereby incorporated herein by reference in its entirety their entireties.

TECHNICAL FIELD

The present disclosure relates to systems and method for restricting a number of primary secondary cells (or primary cells in a secondary cell group) (PSCells) in a mobility history information managed by a wireless device.

BACKGROUND

Mobility History Information

Mobility history information (MHI) has been introduced in Long Term Evolution (LTE) and has been adopted in New Radio (NR) as well. The MHI measurements are accumulated by a wireless device (alternatively, a wireless terminal or User Equipment) independent of its Radio Resource Control (RRC) state (Idle/Inactive/Connected). As part of the MHI, the wireless device stores a cell identifier of the current serving cell for this wireless device and also stores information related to how long the wireless device has stayed in the current serving cell. The wireless device further keeps such a history for up to past 16 serving cells. The wireless device also includes information related to how long it has been out of the coverage scenario as well.

The procedural text related to the wireless device's accumulation of the MHI information is in section 5.7.9 of TS 38.331 specification and the corresponding ASN.1 can be found in the IE 'VisitedCellInfoList' in section 6.3.4 of TS 38.331. Further, the wireless device can indicate the availability of this mobility history via the field 'mobilityHistoryAvail' in either 'RRCSetupComplete' or 'RRCResumeComplete' messages. Based on the MHI reported by the wireless device, the network can estimate the wireless device's mobility characteristics like the wireless device's speed.

Multi-Radio Dual Connectivity

Multi-Radio Dual Connectivity (MR-DC) is a generalization of the Intra-Evolved Universal Terrestrial Radio Access (E-UTRA) Dual Connectivity (DC) described in TS 36.300, where a multiple Reception/Transmission (Rx/Tx) capable wireless device may be configured to utilize resources provided by two different nodes connected via non-ideal backhaul, one providing NR access and the other one providing either E-UTRA or NR access. One node act as the Master Node (MN) and the other as the Secondary Node (SN). The MN and SN are connected via a network interface and at least the MN is connected to the core network. Details on MR-DC can be found in TS 38.401. The primary cell in MN is known as 'PCell' and the primary cell in SN is known as 'PSCell.' In NR, the term 'spCell' is used to define all kinds of serving cell. Thus, 'spCell' can refer to PCell or PSCell depending on the context.

SUMMARY

Systems and methods for restricting a number of primary secondary cells (or primary cells in a secondary cell group) (PSCells) in a mobility history information (MHI) managed by a wireless device are disclosed herein. In one embodiment, a method performed by the wireless device for restricting a number of stored PSCells in MHI comprises storing PSCell history information in memory of the wireless device for a maximum number of PSCells. The PSCell history information is part of MHI stored for the wireless device. In response to the number of PSCells exceeding the maximum number of PSCells, the method further comprises removing at least some of the stored PSCell history information from the memory of the wireless device. In this way, by controlling the number of stored PSCells, the required memory at the wireless device and the resources needed for signaling of the MHI are reduced.

In one embodiment, the step of removing at least some of the stored PSCell history information from the memory of the wireless device comprises removing an oldest PSCell entry from the PSCell history information.

In one embodiment, the step of removing at least some of the stored PSCell history information from the memory of the wireless device comprises removing an oldest PSCell entry from the PSCell history information for any PCell.

In one embodiment, the step of removing at least some of the stored PSCell history information from the memory of the wireless device comprises removing an oldest PSCell entry from the PSCell history information for a current PCell.

In one embodiment, the step of storing PSCell history information in memory of the wireless device comprises storing visited PSCell history information as an independent list in memory of the wireless device.

In one embodiment, the step of storing PSCell history information in memory of the wireless device comprises storing PSCell history information corresponding to a Primary Cell (PCell) nested inside a PCell information.

In one embodiment, the step of storing PSCell history information in memory of the wireless device comprises the wireless device storing PCell identifier information along with a list of PSCell information.

In one embodiment, the step of storing PSCell history information in memory of the wireless device storing a plurality of first or last bits of a PCell identifier.

In one embodiment, the step of removing at least some of the stored PSCell history information from the memory of the wireless device comprises removing an oldest PSCell entry in the independent list.

In one embodiment, the maximum number of PSCells is at least one of (a) a number pre-agreed between the wireless network and a radio-access network node, (b) a number configurable by a radio-access network node, (c) a number stored by the wireless device, (d) a number per PCell and stored by the wireless device, (e) a number that is dependent on the type of an associated PCell, (f) a number that is dependent on a time since when the wireless device was connected to an associated PCell, and (g) a number that is dependent on an entry level of an associated PCell within the mobility history information.

In one embodiment, the maximum number of PSCells is a number pre-agreed between the wireless device and a radio-access network (RAN) node.

In one embodiment, the maximum number of PSCells is a number configurable by a radio-access network node.

In one embodiment, the maximum number of PSCells is a number stored by the wireless device.

In one embodiment, the maximum number of PSCells is a number per PCell, stored by the wireless device.

In one embodiment, the maximum number of PSCells is a number that is dependent on the type of an associated PCell.

In one embodiment, the maximum number of PSCells is a number that is dependent on a time since when the wireless device was connected to an associated PCell.

In one embodiment, the maximum number of PSCells is a number that is dependent on an entry level an associated PCell with the mobility history information.

In one embodiment, the method further comprises storing PSCell history information in memory of the wireless device for up to a maximum number of PSCells. In response to encountering additional PSCell information, the method further comprises removing at least some of the stored PSCell history information from the memory of the wireless device and storing additional PSCell information.

In one embodiment, the removed at least some of the stored PSCell history information is the oldest PSCell entry stored in the memory of the wireless device.

In one embodiment, the method further comprises storing certain information, in a nested PSCell list. The certain information being at least one of (a) an indication in a stored MHI report that PSCell information has been removed, (b) a total number of visited PSCells for each PCell in a MHI report, and (c) a total duration while the wireless device was connected to a PSCell for a given PCell in a MHI report.

In one embodiment, the certain information further comprises a flag stored for each PCell for which the list of PSCells that the wireless device connected to while being served by the PCell was reduced by removal of one or more PSCells.

In one embodiment, the indication in a stored MHI report is a binary flag.

In one embodiment, the binary flag is added only to the latest modified PCell in the MHI report.

In one embodiment, the wireless device does not update a total duration if it removes any PSCell corresponding to a PCell.

In one embodiment, the step of removing at least some of the stored PSCell history information from the memory of the wireless device comprises removing PSCells associated with the oldest stored PCell entry in the nested structure.

In one embodiment, the step of removing at least some of the stored PSCell history information from the memory of the wireless device comprises removing all PSCell history associated with the oldest PCell entry irrespective of the amount of available new PSCell information.

In one embodiment, the step of removing at least some of the stored PSCell history information from the memory of the wireless device comprises removing all stored PSCell entries corresponding to all earlier stored PCells except for a last plurality of PCells if the wireless device needs to store one PSCell entry corresponding to a more recent PCell z.

In one embodiment, the step of removing at least some of the stored PSCell history information from the memory of the wireless device comprises removing one or more stored PSCell entries corresponding to one or more earlier stored PCells of a certain Pcell type if the wireless device needs to store one PSCell entry corresponding to a more recent PCell z.

In one embodiment, the step of removing at least some of the stored PSCell history information from the memory of the wireless device comprises removing all historical stored PSCell history information except for a most recent plurality of PCell entries upon performing a PCell handover and storing the latest PCell information.

In one embodiment, the step of removing at least some of the stored PSCell history information from the memory of the wireless device comprises removing the oldest PSCell entry corresponding to the current PCell if the wireless device needs to store a new PSCell entry corresponding to the same PCell.

Corresponding embodiments of the wireless device are disclosed.

A wireless device for restricting a number of stored PSCells in MHI is adapted to store PSCell history information in memory of the wireless device for a maximum number of PSCells, the PSCell history information being part of MHI stored for the wireless device. In response to the number of PSCells exceeding the maximum number of PSCells, the wireless device is further adapted to remove at least some of the stored PSCell history information from the memory of the wireless device.

A wireless device comprises one or more transmitters, one or more receivers, and processing circuitry associated with the one or more transmitters and the one or more receivers. The processing circuitry is configured to cause the wireless device to store PSCell history information in memory of the wireless device for a maximum number of PSCells, the PSCell history information being part of MHI stored for the wireless device. In response to the number of PSCells exceeding the maximum number of PSCells, the processing circuitry is further configured to cause the wireless device to remove at least some of the stored PSCell history information from the memory of the wireless device.

In one embodiment, a wireless device for restricting the number of stored PSCells in mobility history information comprises processing circuitry configured to perform any of the steps of any of the above embodiments, and power supply circuitry configured to supply power to the wireless device.

In one embodiment, a wireless device for restricting the number of stored PSCells in mobility history information comprises an antenna configured to send and receive wireless signals, radio front-end circuitry connected to the antenna and to processing circuitry, and configured to condition signals communicated between the antenna and the processing circuitry, the processing circuitry being configured to perform any of the steps of any of the above embodiments, an input interface connected to the processing circuitry and configured to allow input of information into the wireless device to be processed by the processing circuitry, an output interface connected to the processing circuitry and configured to output information from the wireless device that has been processed by the processing circuitry, and a battery connected to the processing circuitry and configured to supply power to the wireless device.

In one embodiment, a communication system including a host computer comprises processing circuitry configured to provide user data, and a communication interface configured to forward user data to a cellular network for transmission to a wireless device. The wireless device comprises a radio interface and processing circuitry, the wireless device's components configured to perform any of the steps of any of the above embodiments.

In one embodiment, the cellular network further includes a base station configured to communicate with the wireless device.

In one embodiment, the processing circuitry of the host computer is configured to execute a host application, thereby providing the user data and the wireless device's processing circuitry is configured to execute a client application associated with the host application.

In one embodiment, a method implemented in a communication system including a host computer, a base station and a wireless device comprises, at the host computer, providing user data, and, at the host computer, initiating a transmission carrying the user data to the wireless device via a cellular network comprising the base station. The wireless device performs any of the steps of any of the above embodiments.

In one embodiment, the above method further comprises, at the wireless device, receiving the user data from the base station.

In one embodiment, a communication system including a host computer comprises communication interface configured to receive user data originating from a transmission from a wireless device to a base station. The wireless device comprises a radio interface and processing circuitry. The wireless device's processing circuitry is configured to perform any of the steps of any of the above embodiments.

In one embodiment, the communication system further includes the wireless device.

In one embodiment, the communication system further includes the base station. The base station comprises a radio interface configured to communicate with the wireless device and a communication interface configured to forward to the host computer the user data carried by a transmission from the wireless device to the base station.

In one embodiment, the processing circuitry of the host computer is configured to execute a host application, and the wireless device's processing circuitry is configured to execute a client application associated with the host application, thereby providing the user data.

In one embodiment, the processing circuitry of the host computer is configured to execute a host application, thereby providing request data; and the wireless device's processing circuitry is configured to execute a client application associated with the host application, thereby providing the user data in response to the request data.

In one embodiment, a method implemented in a communication system including a host computer, a base station and a wireless device comprises, at the host computer, receiving user data transmitted to the base station from the wireless device. The wireless device performs any of the steps of any of the above embodiments.

In one embodiment, the above method further comprises, at the wireless device, providing the user data to the base station.

In one embodiment, the method further comprises, at the wireless device, executing a client application, thereby providing the user data to be transmitted, and, at the host computer, executing a host application associated with the client application.

In one embodiment, the method further comprises, at the wireless device, executing a client application, and, at the wireless device, receiving input data to the client application, the input data being provided at the host computer by executing a host application associated with the client application. The user data to be transmitted is provided by the client application in response to the input data.

In one embodiment, a method implemented in a communication system including a host computer, a base station and a wireless device comprises, at the host computer, receiving, from the base station, user data originating from a transmission which the base station has received from the wireless device. The wireless device performs any of the steps of any of the above embodiments.

In one embodiment, the method further comprises, at the base station, receiving the user data from the wireless device.

In one embodiment, the method further comprises, at the base station, initiating a transmission of the received user data to the host computer.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 is a flowchart illustrating a method implemented in a communication system, in accordance with one embodiment.

FIG. 8 is a flowchart illustrating a method implemented in a communication system, in accordance with one embodiment.

DETAILED DESCRIPTION

Figure 1:
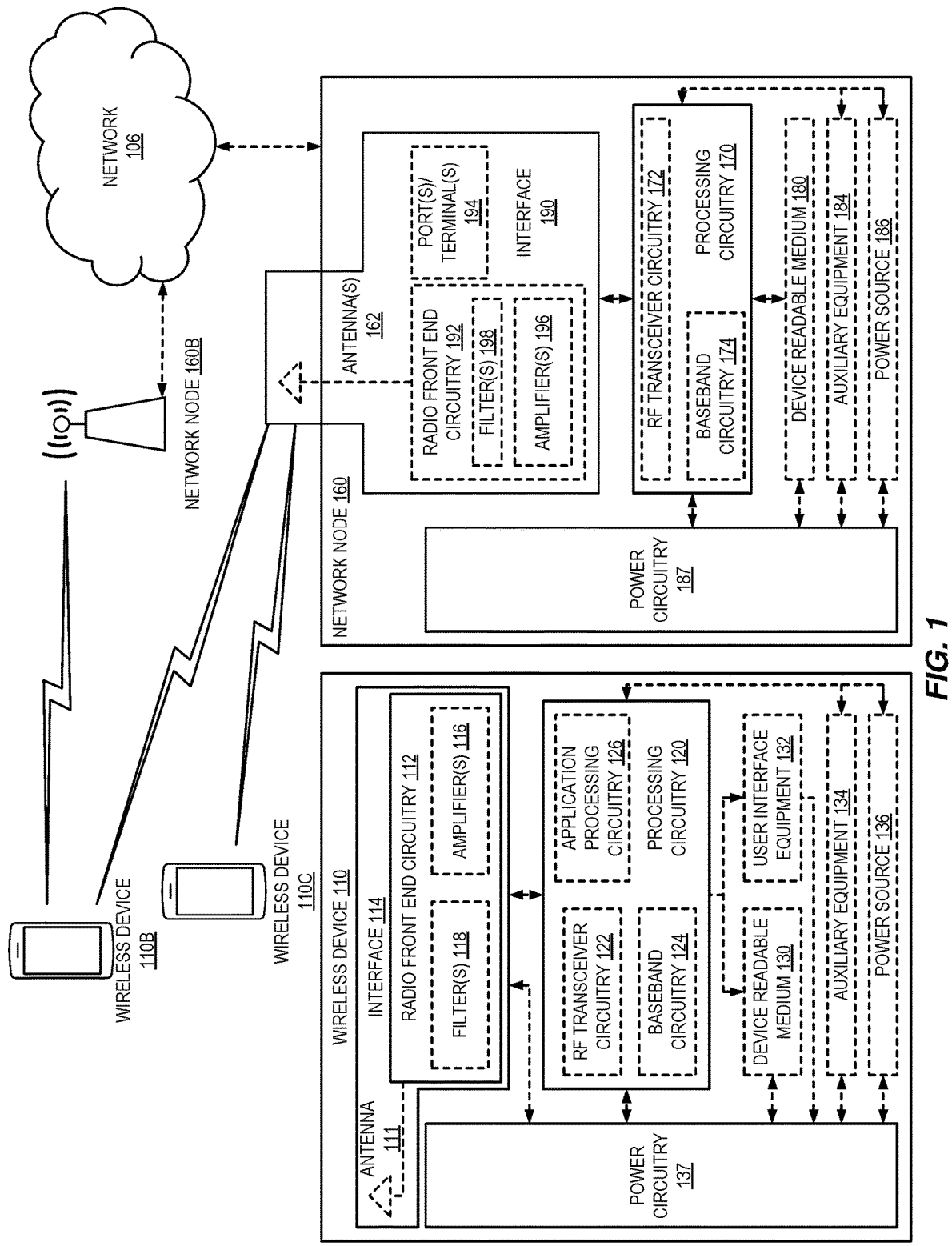
FIG. 1 illustrates an example of a wireless network comprising a wireless device and a network node.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The present disclosure is applicable to any suitable communications standard, including Long Term Evolution (LTE) and New Radio (NR) and to any multi-connectivity scenarios, e.g., dual connectivity scenarios such as LTE-Dual Connectivity (LTE-DC), Evolved Universal Terrestrial Radio Access (E-UTRAN) New Radio-Dual Connectivity (EN-DC), New Radio-Dual Connectivity (NR-DC), New Radio E-UTRAN-Dual Connectivity (NE-DC), etc. In this disclosure, a network node and a Radio Access Network (RAN) node are used interchangeably. A non-limiting example of the network node or the RAN node can be an evolved or enhanced Node B (eNB), 5G-NR base station (gNB), gNB Centralized Unit (gNB-CU), gNB Centralized Unit Control Plane (gNB-CU-CP), gNB Centralized Unit Control Plane (gNB-DU). The terms, a wireless terminal, a wireless device, and a User Equipment (UE), are interchangeable and refers to any device using the network node.

There currently exist certain challenge(s). In TS 38.331, it is mentioned that the amount of PCell information that the UE is supposed to collect has a maximum limit and upon reaching that limit UE would delete the oldest entry of the list in order to collect a new entry. However, the specifications do not address the case of PSCell mobility history information (MHI) and how information in the MHI is managed when the MHI report reaches its maximum size. However, it is proposed that PSCells are to be logged in a nested structure for a given PCell in U.S. Provisional Application Ser. No. 63/090,949, entitled, "Reporting of Primary Secondary Cell (PSCell) change in Mobility history Information" to the present applicant and assignee, and it is not clear how the UE is to limit the number of PSCells to log and upon reaching the limit, how the UE is to log new entries.

Certain aspects of the present disclosure and their embodiments may provide solutions to these or other challenges. In particular, a wireless device is enabled to store and restrict the number of stored PSCell in MHI, ensuring the availability of the latest visited PSCell information in the network. According to certain embodiments, a method is performed by a wireless terminal (so called User Equipment or UE) to store visited PSCell history information. Furthermore, particular embodiments enable the wireless terminal to restrict the amount of stored PSCell history information.

According to certain embodiments, a method comprises the following steps performed by UE to store PSCell history information. The wireless terminal stores visited PSCell history information as an independent list in its memory. The UE stores PCell identifier (Cell Global Identity (CGI)) information along with a given list of PSCell information. The maximum number of PSCells to be stored is N. It may be pre-agreed between the UE and the RAN node or may be configurable by the RAN node. N may refer to a total number of PSCells to be stored. Alternatively, N may refer to a number of PSCells corresponding to a given PCell to be stored by the UE. N can be different for different PCells. For example, N may depend on the type of PCell, e.g., if the PCell is a macro cell, N for the macro cell may be larger than N if the PCell is a pico cell. Alternatively, N may be different for each PCell, depending on the chronology of the connection of the UE with the PCell. The longer the time since the UE was connected to the PCell, the lower N may be. Alternatively, N may depend on the entry level of the PCell within the MHI. For example, if the MHI contains a list of up to 16 PCells, where entry 1 is the most recently visited PCell, while entry 16 is the least recently visited PCell, N may be different for each PCell entry and N may decrease at the increase of the entry levels from 1 to 16.

The method comprises the following action performed by the UE if the recording of a new PSCell constitutes exceeding the total possible amount of PSCells that can be stored. As an option, the wireless terminal stores visited PSCell history information in a nested structure where each PCell's entry history information on the visited PSCells is stored while the UE stayed in that PCell (for example, as described in U.S. Provisional Application Ser. No. 63/090,949, entitled, "Reporting of Primary Secondary Cell (PSCell) change in Mobility history Information" to the present applicant and assignee). In other words, the wireless device stores the visited PSCell history information (corresponding to a PCell) nested inside PCell information.

If the number of stored PSCells are larger than the number N, the UE removes some of the chronologically oldest PSCell in the MHI. The UE may do so in any suitable way, for example, by taking any of the following actions:

- The UE may remove x number of oldest PSCell entries corresponding to an earlier stored PCell y if it needs to store new x number of PSCells corresponding to a more recent PCell z.
- The UE may remove all stored PSCell entries corresponding to an earlier stored PCell y if it needs to store one PSCell entry corresponding to a more recent PCell z.
- The UE may remove all stored PSCell entries corresponding to all earlier stored PCells except for the last n PCells if it needs to store one PSCell entry corresponding to a more recent PCell z.
- The UE may remove one or more stored PSCell entries corresponding to one or more earlier stored PCells of a certain PCell type if it needs to store one PSCell entry corresponding to a more recent PCell z. For example, the UE could remove all PSCell entries corresponding to the oldest PCell entry of a pico cell.
- The UE may remove all historical stored PSCell history information except for the most recent n PCell entries upon performing a PCell Handover procedure in RRC_Connected state and storing the latest PCell information.
- The UE may remove the oldest PSCell entry corresponding to the current PCell if it needs to store a new PSCell entry corresponding to the same PCell.

The UE includes additional information in the MHI report if it has removed some PSCell information. As an option, if the UE stores PSCell history information as an independent list mentioned above, the UE may do so in any suitable way, for example, by taking any of the following actions:

- The UE may include an indication in the stored MHI report indicating that one or more PSCell information was removed. As an example, The UE may include a flag for each PCell for which the list of PSCell the UE connected to while being served by the PCell was reduced by removal of some PSCell.
- The UE may remove some or all of the PSCells for a given PCell and may include an indication of a total number of visited PSCell(s) for each PCell affected by the removals in the MHI report.
- The UE may remove some or all of the PSCells for a given PCell and may include an indication of a total duration while it was connected to one or more PSCell for each PCell affected by the removals in the MHI report.

If the number of stored PSCells are larger than the number N as mentioned above, the UE removes the oldest PSCell history information in first-in-first-out (FIFO) fashion while logging information regarding new visited PSCell information.

There are, proposed herein, various embodiments which address one or more of the issues disclosed herein.

According to one embodiment, a method performed by a wireless device for restricting a number of stored PSCells in MHI includes storing PSCell history information in memory of the wireless device for a maximum number of PSCells and in response to the number of PSCells exceeding the maximum number of PSCells, removing at least some of the stored PSCell history information from the memory of the wireless device.

According to another embodiment, a method performed by a wireless device associated with restricting a number of stored PSCells in MHI. The wireless device stores PSCell information corresponding to PCell entries in a nested structure, includes storing PSCell history information in memory of the wireless device for a maximum number of PSCells, in response to encountering additional PSCell information, removing at least some of the stored PSCell history information from the memory of the wireless device, and storing the additional PSCell information.

Certain embodiments may provide one or more of the following technical advantages. By including the visited PSCells as a part of the UE's MHI, the size of MHI report increases exponentially depending on the deployment scenario. By controlling the number of stored PSCells, the required memory at the UE and the resources needed for signaling of the MHI are reduced. Also, methods in the present disclosure ensures that the wireless device behavior is consistent and the most recent PSCell information is preserved in the MHI report. Alternatively, the methods allow a controlled manner for deletion of recorded history information at the advantage of storage of history information that the RAN wants to prioritize and keep in the list. The methods in the present disclosure also ensure that the RAN node has enough information to take e.g., mobility or dual-connectivity decision even if PSCell history is not complete.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 (alternatively, RAN nodes 160) and 160b, and wireless devices (WD) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, Internet Protocol (IP) networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operations and Maintenance (O&M) nodes, Operation and Support System (OSS) nodes, Self-Organizing Network (SON) nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionalities may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a wireless device implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionalities may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Detailed Embodiments

Embodiments of the present disclosure include methods performed by a wireless device 110 (a wireless terminal or a UE) to store visited PSCell history information. Such methods enable the wireless device 110 to restrict the amount of stored PSCell history information. Certain methods include of following steps performed by wireless device 110 to store PSCell history information, which are described with respect to the following FIG. 2.

At step 201, the wireless device 110 stores information for a maximum number N of PSCells in memory.

In one example, this storing step may be effected by the wireless device storing visited PSCell history information as an independent list in its memory. The wireless device 110 may store a PCell identifier (CGI) information along with a given list of PSCell information.

The amount of maximum number of PSCells to be stored is N. It may be pre-agreed between a wireless device 110 and a RAN node 160 or may be configurable by the RAN node 160. N may refer to a total number of PSCells to be stored. Alternatively, N may refer to a number of PSCells corresponding to a given PCell to be stored by the wireless device 110. N can be different for different PCells. For example, N may depend on the type of PCell, e.g., if the PCell is a macro cell, N for the PCell (that is the macro cell) may be larger than that for the PCell that is a pico cell. Alternatively, N may be different for each PCell, depending on the chronology of connection of the wireless device 110 with the PCell. The longer the time since when the wireless device 110 was connected to the PCell, the lower N may be. Alternatively, N may depend on the entry level of the PCell within the MHI. For example, if the MHI contains a list of up to 16 PCells, where entry 1 is the most recently visited PCell, while entry 16 is the least recently visited PCell, N may be different for each PCell entry and N may decrease at the increase of the entry levels from 1 to 16.

The method continues with the following actions performed by the wireless device 110 if the recording of a new PSCell constitutes exceeding the total possible amount of PSCells that can be stored.

Figure 2:
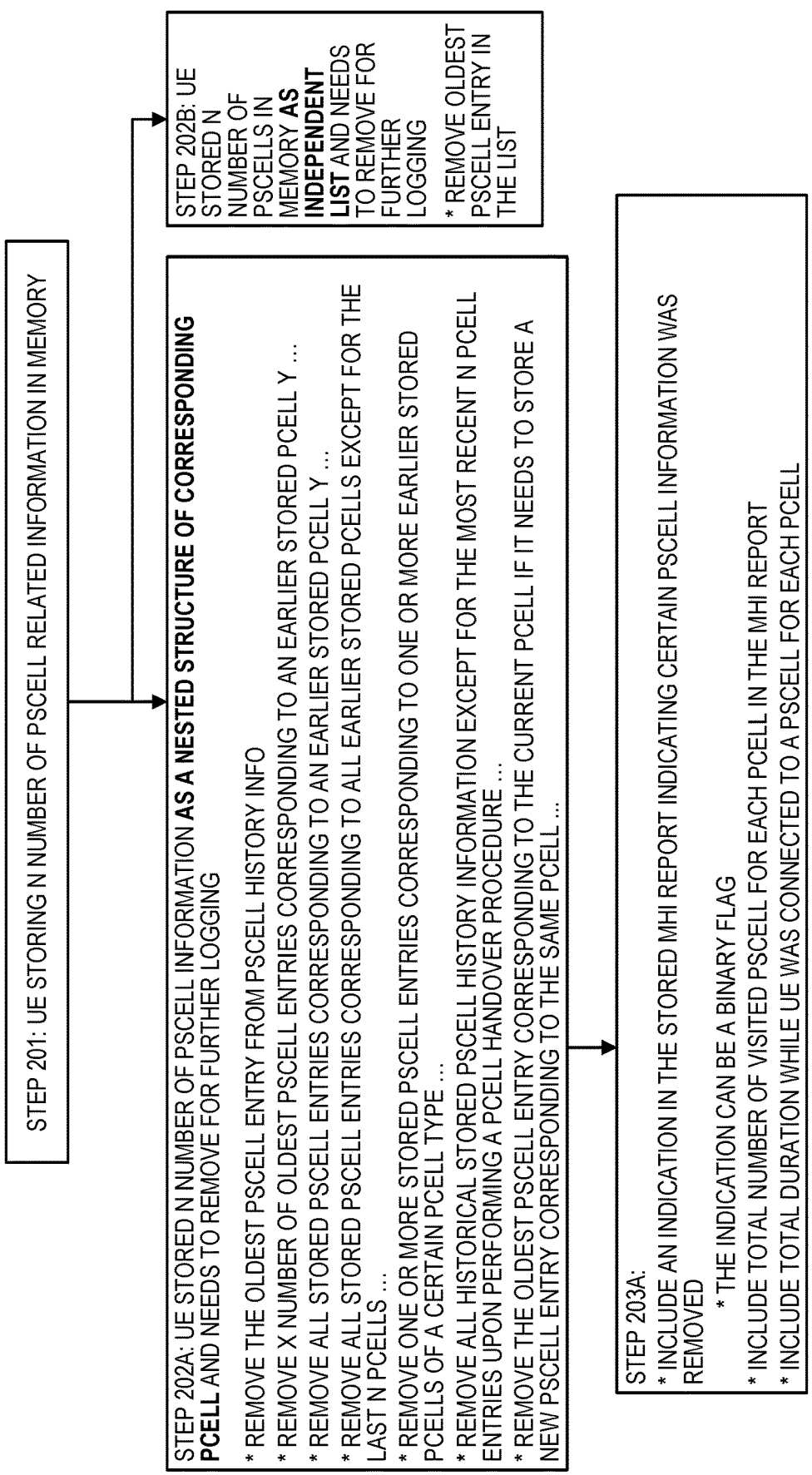
FIG. 2 is a flow diagram on methods performed by the wireless device in accordance with some embodiments of the present disclosure.

With reference to step 202A of FIG. 2, the wireless device 110 stores visited PSCell history information in a nested structure where each PCell entry history information on the visited PSCells while the wireless device 110 stayed in that PCell (for example, as described in U.S. Provisional Application Ser. No. 63/090,949, entitled, "Rebating of Primary Secondary Cell (PSCell) change in Mobility history Information" to the present applicant and assignee). This is referred to as 'Option 1' and refers to the left side of FIG. 2. If the number of stored PSCells are larger than the number N as mentioned in step 201, the wireless device 110 removes some of the chronologically oldest PSCells in the MHI. The wireless device 110 may do so in any suitable way, for example, by taking any of the following actions:

- The wireless device 110 may remove x number of oldest PSCell entries corresponding to an earlier stored PCell y if it needs to store new x number of PSCells corresponding to a more recent PCell z.
- The wireless device 110 may remove all stored PSCell entries corresponding to an earlier stored PCell y if it needs to store one PSCell entry corresponding to a more recent PCell z.
- The wireless device 110 may remove all stored PSCell entries corresponding to all earlier stored PCells except for the last n PCells if it needs to store one PSCell entry corresponding to a more recent PCell z.
- The wireless device 110 may remove one or more stored PSCell entries corresponding to one or more earlier stored PCells of a certain PCell type if it needs to store one PSCell entry corresponding to a more recent PCell z. For example, the wireless device 110 could remove all PSCell entries corresponding to the oldest PCell entry of a pico cell.
- The wireless device 110 may remove all historical stored PSCell history information except for the most recent n PCell entries upon performing a PCell Handover procedure in RRC_Connected state and storing the latest PCell information.
- The wireless device 110 may remove the oldest PSCell entry corresponding to the current PCell if it needs to store a new PSCell entry corresponding to the same PCell.

Continuing with Option 1 with step 203A of FIG. 2, the wireless device 110 includes or store additional information in the MHI report if it has removed some PSCell information. The wireless device 110 may do so in any suitable way, for example, by taking any of the following actions:

- The wireless device 110 may include an indication in the stored MHI report indicating that one or more PSCell information was removed. As an example, the wireless device 110 may include a flag for each PCell for which the list of PSCell the wireless device 110 connected to while being served by the PCell was reduced by removal of some PSCell.

The wireless device 110 may remove some or all of the PSCells for a given PCell and include an indication of a total number of visited PSCell for each PCell affected by the removals in the MHI report.

The wireless device 110 may remove some or all of the PSCells for a given PCell and include an indication of a total duration while it was connected to one or more PSCell for each PCell affected by the removals in the MHI report.

Referring to the right side of FIG. 2, an alternative Option 2 (step 202B) is described in which the wireless device 110 stores PSCell history information as an independent list. At step 202B, if the number of stored PSCells are larger than the number N as mentioned in step 201, the wireless device 110 removes the oldest PSCell history information in first-in-first-out (FIFO) fashion while logging information regarding new visited PSCell information.

Certain embodiments of these disclosure include a method performed by the wireless device 110 to store PSCell information. Certain embodiments include a method to remove PSCell information if the number of PSCells are greater than a certain number N.

Embodiment #S1

In this embodiment, the wireless device 110 stores N number of visited PSCell history information. N is specified as follows:
- N can be pre-agreed between the wireless device 110 and the RAN nodes 160
- N can be configurable by the RAN node 160 towards wireless device 110
- N can refer to absolute number of PSCell information that can be stored in the wireless device 110
- N can refer to number of PSCells to be stored per PCell in the wireless device 110.
- N may depend on the type of PCell, e.g., if the PCell is a macro cell, N may be larger than if the PCell is a pico cell.
- N may be different for each PCell, depending on the chronology of connection of the wireless device 110 with the PCell. The longer the time since when the wireless device 110 was connected to the PCell, the lower N may be.
- N may depend on the entry level of the PCell within the MHI. For example, if the MHI contains a list of up to 16 PCells, where entry 1 is the most recently visited PCell, while entry 16 is the least recently visited PCell, N may be different for each PCell entry and N may decrease at the increase of the entry levels from 1 to 16.

Embodiment #S2

The wireless device 110 stores N number of visited PSCell history information as an independent list in its memory.
- The wireless device 110 stores PCell identifier (CGI) information along with a given PSCell information. Alternatively, wireless device 110 stores the n first bits or the n last bits of the PCell identifier (CGI).

Embodiment #S3

Upon storing the maximum number of PSCells, if the wireless device 110 needs to store more visited PSCell information. Wireless device 110 may remove oldest PSCell entries to store new information.
- The wireless device 110 may remove oldest PSCell entry in the list to include the new visited PSCell information The below embodiments #S4 and #S5 are related to if the wireless device 110 stores visited PSCell history information corresponding to a PCell nested inside a PCell information, for example, as described in U.S. Provisional Application Ser. No. 63/090,949, entitled, "Reporting of Primary Secondary Cell (PSCell) change in Mobility history Information" to the present applicant and assignee.

Embodiment #S4

A wireless device 110 may include the below additional information in the nested PSCell list—
- The wireless device 110 may include an indication in the stored MHI report indicating certain one or more PSCell information was removed
  - The indication can be a binary flag. As an example, the wireless device 110 may include a flag for each PCell for which the list of PSCell the wireless device 110 connected to while being served by the PCell was reduced by removal of some PSCell. Alternatively, this flag could be added only to the latest modified PCell in the history, meaning that all the PCells visited prior this entry may have an incomplete PSCell history
- Total number of visited PSCell for each PCell in the MHI report.
- Total duration while it was connected to a PSCell for a given PCell in the MHI report.
  - The wireless device 110 does not update the total duration if it removes any PSCell corresponding to a PCell.

Embodiment #S5

Upon storing the maximum number of PSCells, if the wireless device 110 needs to store more visited PSCell information. the wireless device 110 may remove oldest PSCell entries to store new information.
- The wireless device 110 may remove required oldest number of PSCells associated with the oldest stored PCell entry in a nested structure
- The wireless device 110 may remove all PSCell history associated with the oldest PCell entry irrespective of the number of available new PSCell information
- The wireless device 110 may remove all stored PSCell entries corresponding to all earlier stored PCells except for the last n PCells if it needs to store one PSCell entry corresponding to a more recent PCell z.
- The wireless device 110 may remove one or more stored PSCell entries corresponding to one or more earlier stored PCells of a certain PCell type if it needs to store one PSCell entry corresponding to a more recent PCell z. For example, the wireless device 110 could remove all PSCell entries corresponding to the oldest PCell entry of a pico cell.
- The wireless device 110 may remove all historical stored PSCell history information except for the most recent n PCell entries upon performing a PCell handover and storing the latest PCell information.
- The wireless device 110 may remove the oldest PSCell entry corresponding to the current PCell if it needs to store a new PSCell entry corresponding to the same PCell.

Figure 3:
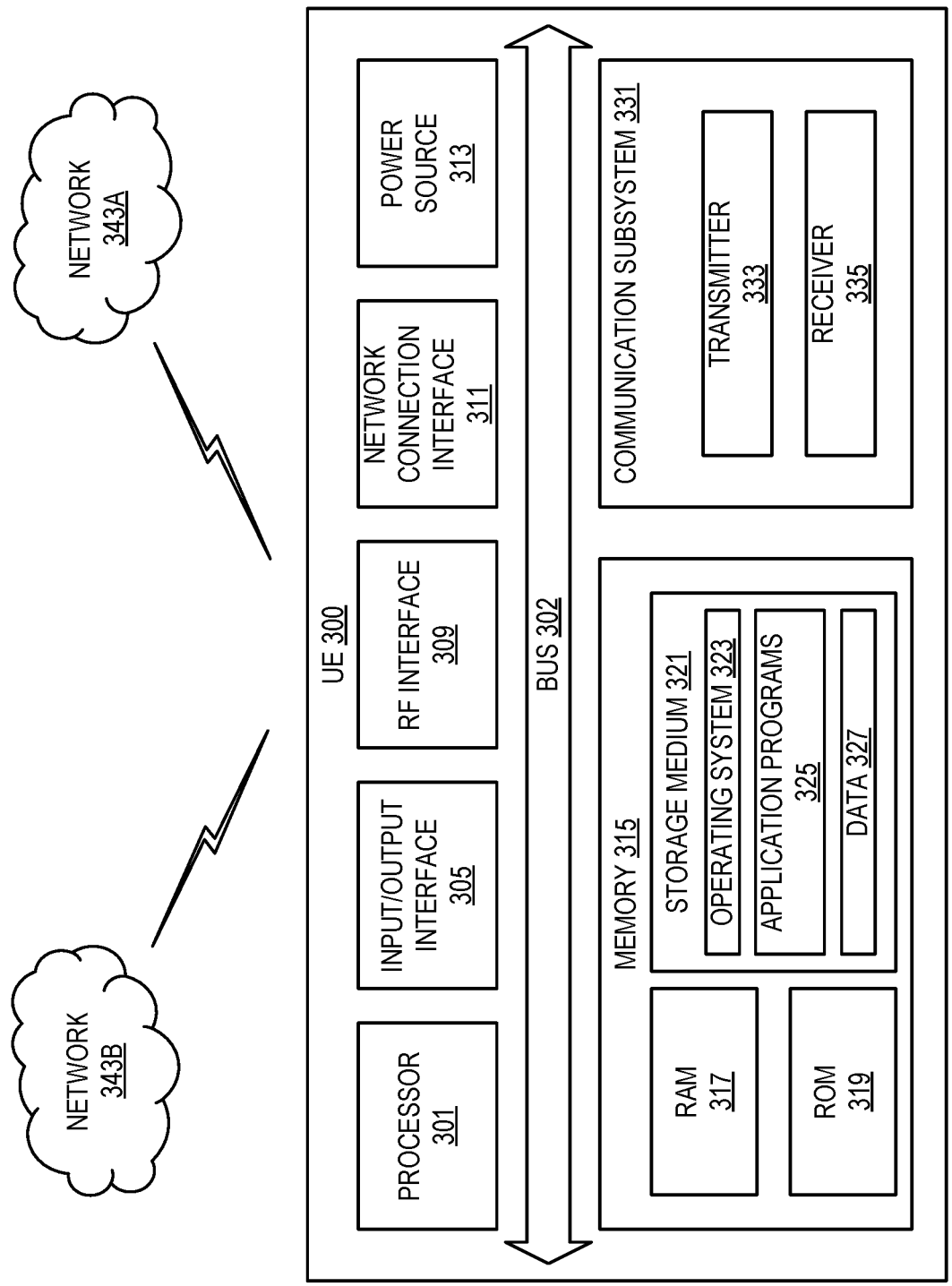
FIG. 3 illustrates one embodiment of a User Equipment (UE), which corresponds to the wireless device, in accordance with some embodiments of the present disclosure.

FIG. 3 illustrates one embodiment of a UE (which corresponds to the wireless device 110) in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 3200 may be any UE identified by the $3^{rd}$ Generation Partnership Project (3GPP), including a NB-IoT UE, a machine type communication (MTC) UE, and/or an enhanced MTC (eMTC) UE. UE 300, as illustrated in FIG. 3, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 300 (which corresponds to the wireless device 110) includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343a. Network 343a may encompass wired and/or wireless networks such as a local-area network (LAN), a wide-area network (WAN), a computer network, a wireless network, a telecommunications network, another like network or any combination thereof. For example, network 343a may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343b using communication subsystem 331. Network 343a and network 343b may be the same network or networks or different network or networks. Communication subsystem 331 may be configured to include one or more transceivers used to communicate with network 343b. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343b may encompass wired and/or wireless networks such as a local-area network (LAN), a wide-area network (WAN), a computer network, a wireless network, a telecommunications network, another like network or any combination thereof. For example, network 343b may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
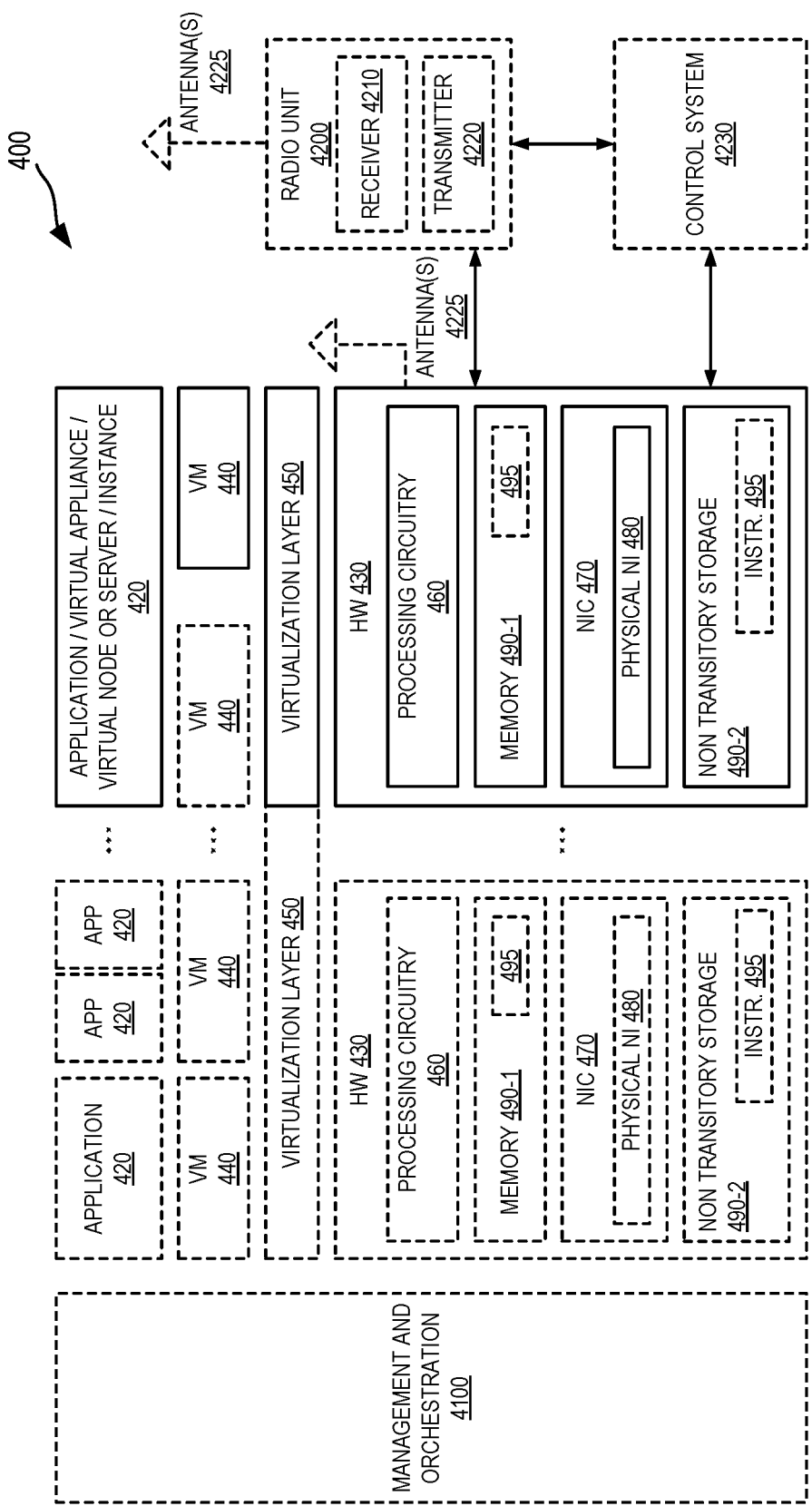
FIG. 4 is a schematic block diagram illustrating a virtualization environment in which functions implemented by some embodiments may be virtualized.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g., such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network element (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signalling can be effected with the use of control system 4230 which may alternatively be used for communication between the hardware nodes 430 and radio units 4200.

Figure 5:
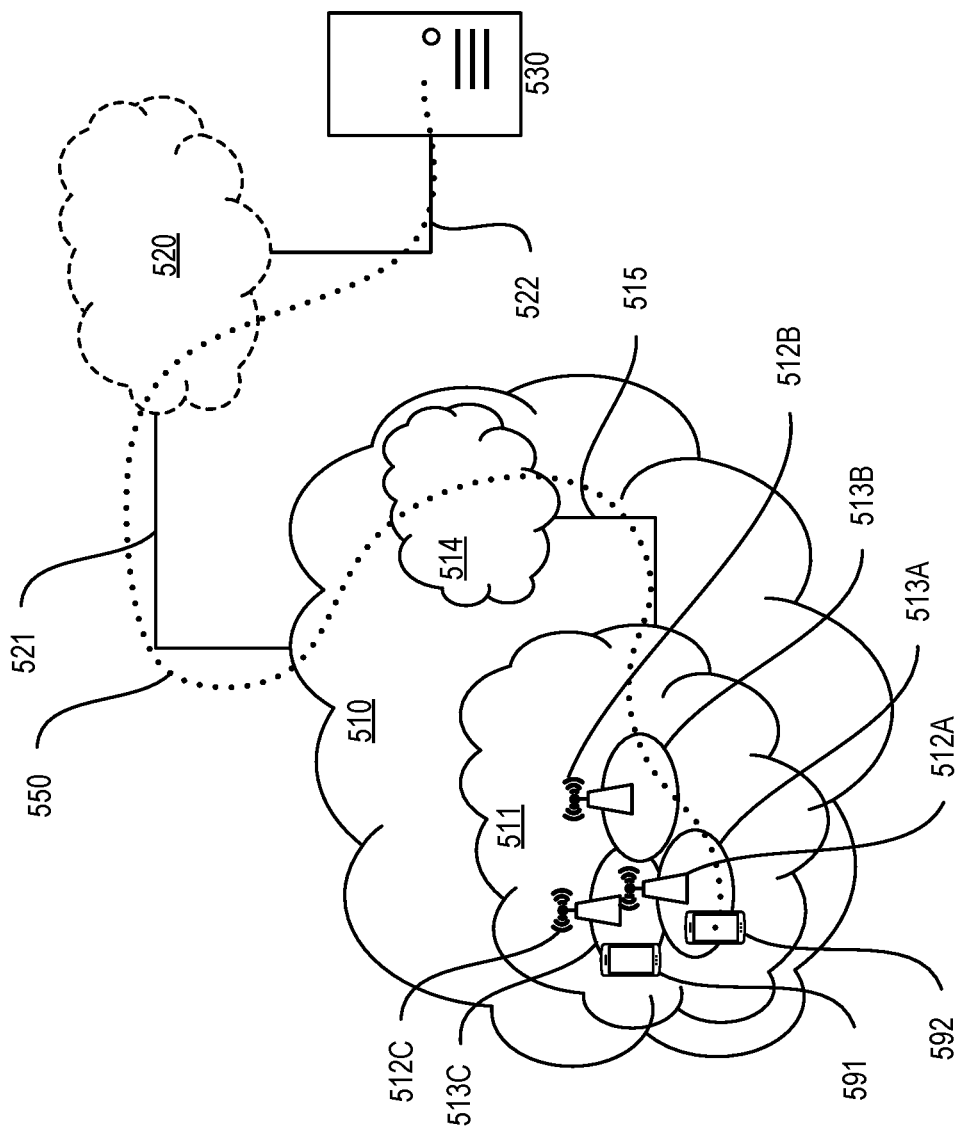
FIG. 5 illustrates a communication system including telecommunication network, such as a 3GPP-type cellular network, which comprises access network, such as a radio access network, and core network.

With reference to FIG. 5, in accordance with an embodiment, a communication system includes telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more subnetworks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

Figure 6:
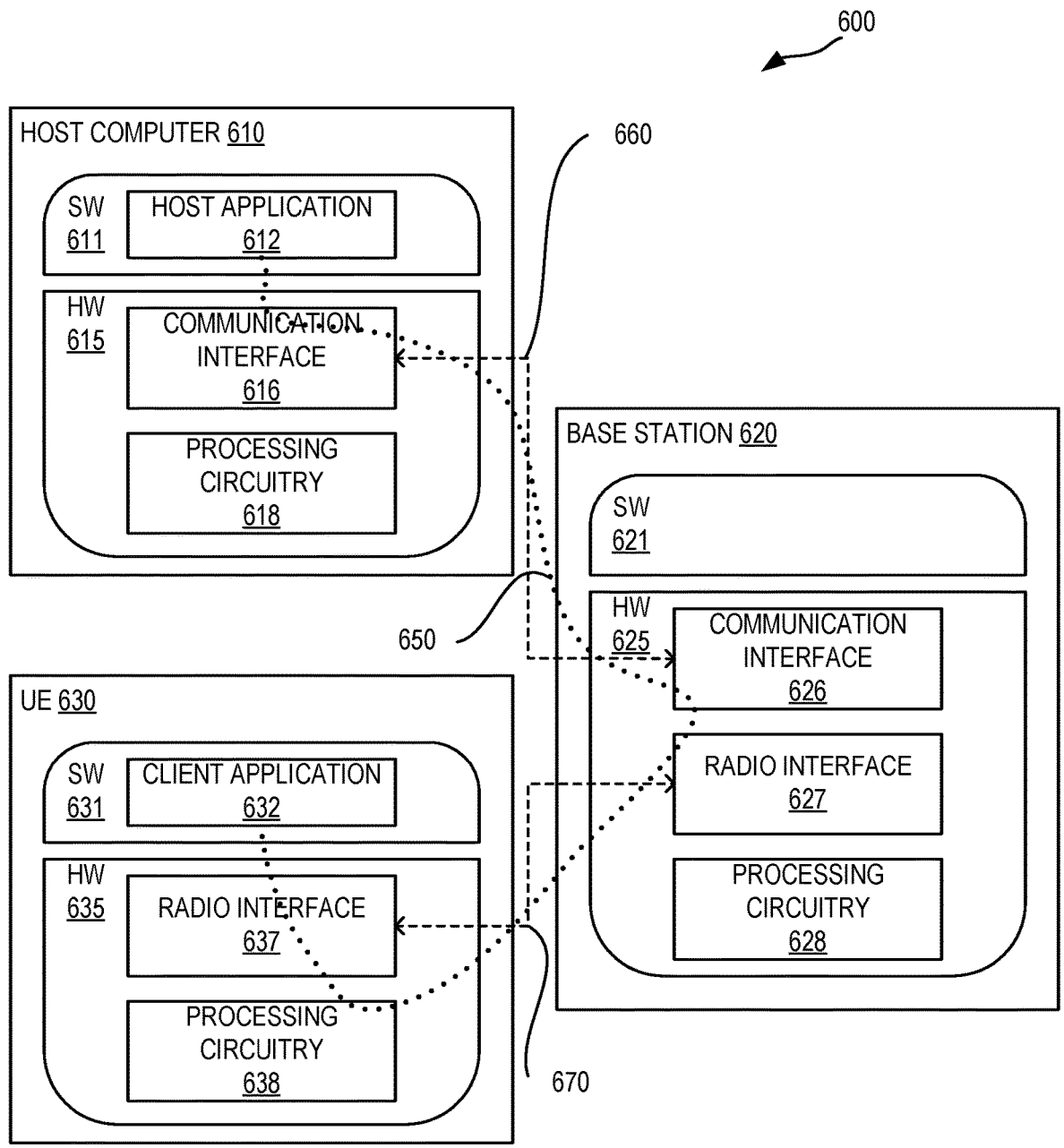
FIG. 6 illustrates a communication system including a host computer.

It is noted that host computer 610, base station 620 and UE 630 illustrated in FIG. 6 may be similar or identical to host computer 530, one of base stations 512*a*, 512*b*, 512*c* and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve, e.g. data rate, latency, power consumption and thereby provide benefits such as, e.g. reduced user waiting time, relaxed restriction on file size, better responsiveness, and extended battery lifetime.

A measurement procedure may be provided for the purpose of monitoring data rate, latency, and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figures 9, 10:
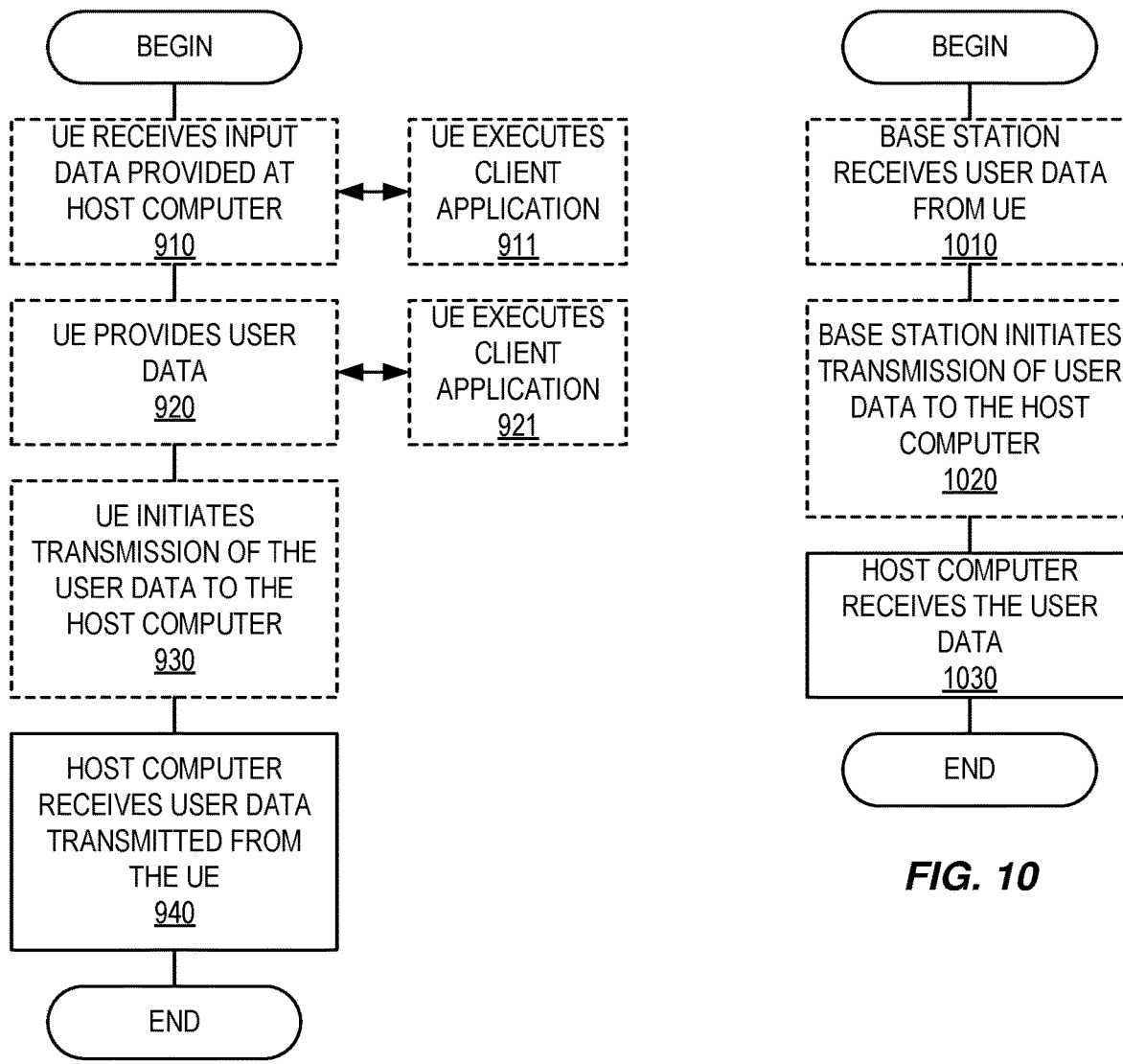
FIG. 9 is a flowchart illustrating a method implemented in a communication system, in accordance with one embodiment.
FIG. 10 is a flowchart illustrating a method implemented in a communication system, in accordance with one embodiment.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Those skilled in the art will recognize improvements and modifications to the embodiments of the present disclosure. All such improvements and modifications are considered within the scope of the concepts disclosed herein.

Group A Embodiments

Embodiment 1: (Embodiment S1) A method performed by a wireless device for restricting the number of stored PSCells in mobility history information, the method comprising: storing PSCell history information in memory of the wireless device for a maximum number of PSCells; and in response to the number of PSCells exceeding the maximum number of PSCells, removing at least some of the stored PSCell history information from the memory of the wireless device.

Embodiment 2: (Embodiment S3) The method of embodiment 1, wherein removing at least some of the stored PSCell history information from the memory of the wireless device comprises removing an oldest PSCell entry from the PSCell history information.

Embodiment 3: (Embodiment S2) The method of embodiment 1, wherein storing PSCell history information in memory of the wireless device comprises storing visited PSCELL history information as an independent list in memory of the wireless device.

Embodiment 4: (Embodiment S2) The method of embodiment 2, wherein storing PSCell history information in memory of the wireless device comprises the wireless device storing PCell identifier information along with a list of PSCell information.

Embodiment 5: (Embodiment S2) The method of embodiment 2, wherein storing PSCell history information in memory of the wireless device comprises the wireless device stored a plurality of first or last bits of a PCell identifier.

Embodiment 6: (Embodiment S1) The method of any of the above embodiments, wherein the maximum number of PSCells is one of: a number pre-agreed between the wireless network and a radio-access network node; a number configurable by a radio-access network node; a number stored by the wireless device; a number per PCell and stored by the wireless device; a number that is dependent on the type of an associated PCell; a number that is dependent on a time since when the wireless device was connected to an associated PCell; a number that is dependent on an entry level of an associated PCell within the mobility history information.

Embodiment 7: (Embodiment S1) The method of embodiment 6, wherein the maximum number of PSCells is a number pre-agreed between the mobile device and a node of a radio-access network.

Embodiment 8: (Embodiment S1) The method of embodiment 6, wherein the maximum number of PSCells is a number configurable by a radio-access network node.

Embodiment 9: (Embodiment S1) The method of embodiment 6, wherein the maximum number of PSCells is a number stored by the wireless device.

Embodiment 10: (Embodiment S1) The method of embodiment 6, wherein the maximum number of PSCells is a number per PCell, stored by the wireless device.

Embodiment 11: (Embodiment S1) The method of embodiment 6, wherein the maximum number of PSCells is a number that is dependent on the type of an associated PCell.

Embodiment 12: (Embodiment S1) The method of embodiment 6, wherein the maximum number of PSCells is a number that is dependent on a time since when the wireless device was connected to an associated PCell.

Embodiment 13: (Embodiment S1) The method of embodiment 6, wherein the maximum number of PSCells is a number that is dependent on an entry level an associated PCell with the mobility history information.

Group B Embodiments

Embodiment 14: (Embodiment S3) A method performed by a wireless device associated with restricting the number of stored PSCells in mobility history information, the method comprising: storing PSCell history information in memory of the wireless device for a maximum number of PSCells; in response to encountering additional PSCell information, removing at least some of the stored PSCell history information from the memory of the wireless device; and storing the additional PSCell information.

Embodiment 15: (Embodiment S3) The method of embodiment 14, wherein the removed at least some of the stored PSCell history information is the oldest PSCell entry stored in the wireless device memory.

Embodiment 16: (Embodiment S4) A method performed by a wireless device associated with restricting the number of stored PSCells in mobility history information, the method comprising: storing certain information, in a nested PSCell list, the certain information being at least one of: an indication in a stored mobility information history report that PSCell information has been removed; a total number of visited PSCells for each PCell in a mobile history information report; and a total duration while the wireless device was connected to a PSCell for a given PCell in a mobile history information report.

Embodiment 17: (Embodiment S4) The embodiment of method 16, wherein the indication in a stored mobility information history report is a binary flag.

Embodiment 18: (Embodiment S4) The embodiment of method 16, the wireless device storing a flag for each PCell for which the list of PSCell the wireless device connected to while being served by the PCell was reduced by removal of some PSCell.

Embodiment 19: (Embodiment S4) The embodiment of method 17, wherein the binary flag is added only to the latest modified PCell in the mobility information history report.

Embodiment 20: (Embodiment S4) The embodiment of method 16, wherein the wireless device does not update a sum duration if it removes any PSCell corresponding to a PCell.

Embodiment 21: (Embodiment S4) The embodiment of method 16, wherein the certain information comprises: an indication in a stored mobility information history report that PSCell information has been removed; a total number of visited PSCells for each PCell in a mobile history information report; and a total duration while the wireless device was connected to a PSCell for a given PCell in a mobile history information report.

Embodiment 22: (Embodiment S4) The method of embodiment 16, wherein the certain information comprises at least two of: an indication in a stored mobility information history report that PSCell information has been removed; a total number of visited PSCells for each PCell in a mobile history information report; and a total duration while the wireless device was connected to a PSCell for a given PCell in a mobile history information report.

Embodiment 23: (Embodiment S5) A method performed by a wireless device associated with restricting the number of stored PSCells in mobility history information, wherein the wireless device stores PSCell information corresponding to PCell entries in a nested structure, the method comprising: storing PSCell history information in memory of the wireless device for a maximum number of PSCells; in response to encountering additional PSCell information, removing at least some of the stored PSCell history information from the memory of the wireless device; and storing the additional PSCell information.

Embodiment 24: (Embodiment S5) The method of embodiment 23, wherein removing at least some of the stored PSCell history information from the memory of the wireless device comprises removing PSCells associated with the oldest stored PCell entry in the nested structure.

Embodiment 25: (Embodiment S5) The method of embodiment 23, wherein removing at least some of the stored PSCell history information from the memory of the wireless device comprises removing all PSCell history associated with the oldest PCell entry irrespective of the amount of available new PSCell information.

Embodiment 26: (Embodiment S5) The method of embodiment 23, wherein removing at least some of the stored PSCell history information from the memory of the wireless device comprises removing all stored PSCell entries corresponding to all earlier stored PCells except for a last plurality of PCells if the wireless device needs to store one PSCell entry corresponding to a more recent PCell z.

Embodiment 27: (Embodiment S5) The method of embodiment 23, wherein removing at least some of the stored PSCell history information from the memory of the wireless device comprises removing one or more stored PSCell entries corresponding to one or more earlier stored PCells of a certain PCell type if the wireless device needs to store one PSCell entry corresponding to a more recent PCell z.

Embodiment 28: (Embodiment S5) The method of embodiment 23, wherein removing at least some of the stored PSCell history information from the memory of the wireless device comprises removing all historical stored PSCell history information except for a most recent plurality of PCell entries upon performing a PCell handover and storing the latest PCell information.

Embodiment 29: (Embodiment S5) The method of embodiment 23, wherein removing at least some of the stored PSCell history information from the memory of the wireless device comprises removing the oldest PSCell entry corresponding to the current PCell if the wireless needs to store a new PSCell entry corresponding to the same PCell.

Embodiment 30: (Embodiment S5) The method of any of the previous embodiments, further comprising: providing user data; and forwarding the user data to a host computer via the transmission to the base station.

Group C Embodiments

Embodiment 31: A wireless device for restricting the number of stored PSCells in mobility history information, the wireless device comprising: processing circuitry configured to perform any of the steps of any of the Group A embodiments; and power supply circuitry configured to supply power to the wireless device.

Embodiment 32: A user equipment (UE) for restricting the number of stored PSCells in mobility history information, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 33: A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Embodiment 34: The communication system of the previous embodiment, wherein the cellular network further includes a base station configured to communicate with the UE.

Embodiment 35: The communication system of the previous 2 embodiments, wherein: the processing circuitry of the host computer is configured to execute a host application, thereby providing the user data; and the UE's processing circuitry is configured to execute a client application associated with the host application.

Embodiment 36: A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Embodiment 37: The method of the previous embodiment, further comprising at the UE, receiving the user data from the base station.

Embodiment 38: A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Embodiment 39: The communication system of the previous embodiment, further including the UE.

Embodiment 40: The communication system of the previous 2 embodiments, further including the base station, wherein the base station comprises a radio interface configured to communicate with the UE and a communication interface configured to forward to the host computer the user data carried by a transmission from the UE to the base station.

Embodiment 41: The communication system of the previous 3 embodiments, wherein: the processing circuitry of the host computer is configured to execute a host application; and the UE's processing circuitry is configured to execute a client application associated with the host application, thereby providing the user data.

Embodiment 42: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 43: A method implemented in a communication system including a host computer, a base station and a user equipment (UE), the method comprising: at the host computer, receiving user data transmitted to the base station from the UE, wherein the UE performs any of the steps of any of the Group A embodiments.

Embodiment 44: The method of the previous embodiment, further comprising, at the UE, providing the user data to the base station.

Embodiment 45: The method of the previous 2 embodiments, further comprising: at the UE, executing a client application, thereby providing the user data to be transmitted; and at the host computer, executing a host application associated with the client application.

Embodiment 46: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 47: A method implemented in a communication system including a host computer, a base station and a User Equipment (UE), the method comprising: at the host computer, receiving, from the base station, user data originating from a transmission which the base station has received from the UE, wherein the UE performs any of the steps of any of the Group A embodiments.

Embodiment 48: The method of the previous embodiment, further comprising at the base station, receiving the user data from the UE.

Embodiment 49: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
AP Access Point
BS Base Station
BSC Base Station Controller
BTS Base Transceiver Station
CD Compact Disk
CGI Cell Global Identity
CPE Customer Premise Equipment
CPU Central Processing Unit
DAS Distributed Antenna System
DC Dual Connectivity
DVD Digital Video Disk
eNB Enhanced or Evolved Node B
EN-DC E-UTRAN New Radio-Dual Connectivity
E-UTRA Evolved Universal Terrestrial Radio Access
FIFO First-In-First-Out
gNB New Radio Base Station
gNB-CU New Radio Base Station Centralized Unit
gNB-CU-CP New Radio Base Station Centralized Unit Control Plane
GSM Global System for Mobile Communications
IoT Internet of Things
IP Internet Protocol
LAN Local Area Network
LEE Laptop Embedded Equipment
LME Laptop Mounted Equipment
LTE Long Term Evolution
LTE-DC Long Term Evolution Dual Connectivity
M2M Machine-to-Machine
MCE Multi-cell or Multicast Coordination Entity
MHI Mobility history information
MME Mobility Management Entity
MN Master Node
MR-DC Multi-Radio Dual Connectivity
MSC Mobile Switching Center
MSR Multi-Standard Radio NB-IoT Narrow Band Internet of Things
NE-DC New Radio E-UTRAN-Dual Connectivity
NR New Radio
NR-DU New Radio-Dual Connectivity
O&M Operations and Maintenance
OSS Operation and Support System
OTT Over-The-Top
PCell Primary Cell
PDA Personal Digital Assistant
PSCell Primary Secondary Cell
PSTN Public Switched Telephone Network
RAM Random Access Memory
RAN Radio Access Network
RAT Radio Access Technology
RF Radio Frequency
RNC Radio Network Controller
ROM Read Only Memory
RRC Radio Resource Control
RRHs Remote Radio Heads
RRU Remote Radio Unit
Rx Reception
SN Secondary Node
SOC System on a Chip
SON Self-Organizing Network
Tx Transmission
UE User Equipment
UMTS Universal Mobile Telecommunications System
V2I Vehicle-to-Infrastructure
V2V Vehicle-to-Vehicle
V2X Vehicle-to-Everything
VMM Virtual Machine Monitor
WAN Wide Area Network
WD Wireless Device
WiMax Worldwide Interoperability for Microwave Access
WLAN Wireless Local Area Network

The invention claimed is:

1. A method performed by a wireless device for restricting a number of stored Primary Secondary Cells, PSCells, in Mobility History Information, MHI, the method comprising:
storing PSCell history information in memory of the wireless device for a maximum number of PSCells across all Primary Cell, PCell, entries, the PSCell history information being part of MHI stored for the wireless device, further comprising storing the PSCell history information corresponding to a PCell as PSCell entries in a nested structure; and
in response to the number of PSCells exceeding the maximum number of PSCells, removing at least some of the stored PSCell history information corresponding to an oldest PSCell entry from any of the PCell entries in the nested structure from the memory of the wireless device.

2. The method of claim 1, wherein removing at least some of the stored PSCell history information from the memory of the wireless device comprises removing an oldest PSCell entry from the PSCell history information for a current PCell.

3. The method of claim 1, wherein storing PSCell history information in memory of the wireless device comprises the wireless device storing PCell identifier information along with a list of PSCell information.

4. The method of claim 1, wherein storing PSCell history information in memory of the wireless device storing a plurality of first or last bits of a PCell identifier.

5. The method of claim 1, wherein the maximum number of PSCells is at least one of (a) a number pre-agreed between the wireless network and a radio-access network node, (b) a number configurable by a radio-access network node, (c) a number stored by the wireless device, (d) a number per PCell and stored by the wireless device, (e) a number that is dependent on the type of an associated PCell, (f) a number that is dependent on a time since when the wireless device was connected to an associated PCell, and (g) a number that is dependent on an entry level of an associated PCell within the mobility history information.

6. The method of claim 1, further comprising:
storing certain information, in a nested PSCell list, the certain information being at least one of:
an indication in a stored MHI report that PSCell information has been removed;
a total number of visited PSCells that were removed for each PCell in a MHI report; and
a total duration while the wireless device was connected to a PSCell for a given PCell in a MHI report.

7. The claim of method 1, wherein the wireless device does not update a total duration if it removes any PSCell corresponding to a PCell.

8. The method of claim 1, wherein removing at least some of the stored PSCell history information from the memory of the wireless device comprises removing all PSCell history associated with the oldest PCell entry irrespective of the amount of available new PSCell information.

9. The method of claim 1, wherein removing at least some of the stored PSCell history information from the memory of the wireless device comprises removing all stored PSCell entries corresponding to all earlier stored PCells except for a last plurality of PCells if the wireless device needs to store one PSCell entry corresponding to a more recent PCell z.

10. The method of claim 1, wherein removing at least some of the stored PSCell history information from the memory of the wireless device comprises removing one or more stored PSCell entries corresponding to one or more earlier stored PCells of a certain PCell type if the wireless device needs to store one PSCell entry corresponding to a more recent PCell z.

11. The method of claim 1, wherein removing at least some of the stored PSCell history information from the memory of the wireless device comprises removing all historical stored PSCell history information except for a most recent plurality of PCell entries upon performing a PCell handover and storing the latest PCell information.

12. The method of claim 1, wherein removing at least some of the stored PSCell history information from the memory of the wireless device comprises removing the oldest PSCell entry corresponding to the current PCell if the wireless device needs to store a new PSCell entry corresponding to the same PCell.

13. A wireless device for restricting a number of stored Primary Secondary Cells, PSCells, in Mobility History Information, MHI, adapted to:
store PSCell history information in memory of the wireless device for a maximum number of PSCells across all Primary Cell, PCell, entries, the PSCell history information being part of MHI stored for the wireless device further adapted to store the PSCell history information corresponding to a PCell as PSCell entries in a nested structure; and
in response to the number of PSCells exceeding the maximum number of PSCells, remove at least some of the stored PSCell history information corresponding to an oldest PSCell entry from any of the PCell entries in the nested structure from the memory of the wireless device.

14. The wireless device of claim 13, wherein, in order to remove the at least some of the stored PSCell history information from the memory of the wireless device, the wireless device is further adapted to remove an oldest PSCell entry from the PSCell history information for a current PCell.

15. The wireless device of claim 13, wherein the PSCell history information stored in memory of the wireless device comprises PCell identifier information along with a list of PSCell information.

16. The wireless device of claim 13, wherein the PSCell history information stored in memory of the wireless device comprises a plurality of first or last bits of a PCell identifier.

17. The wireless device of claim 13, wherein the maximum number of PSCells is at least one of (a) a number pre-agreed between the wireless network and a radio-access network node, (b) a number configurable by a radio-access network node, (c) a number stored by the wireless device, (d) a number per PCell and stored by the wireless device, (e) a number that is dependent on the type of an associated PCell, (f) a number that is dependent on a time since when the wireless device was connected to an associated PCell, and (g) a number that is dependent on an entry level of an associated PCell within the mobility history information.

18. The wireless device of claim 13, further adapted to:
store certain information, in a nested PSCell list, the certain information being at least one of:
an indication in a stored MHI report that PSCell information has been removed;
a total number of visited PSCells that were removed for each PCell in a MHI report; and
a total duration while the wireless device was connected to a PSCell for a given PCell in a MHI report.

19. The wireless device of claim 13, wherein the wireless device does not update a total duration if it removes any PSCell corresponding to a PCell.

20. The wireless device of claim 13, wherein the at least some of the stored PSCell history information removed from the memory of the wireless device comprises:
all PSCell history associated with the oldest PCell entry irrespective of the amount of available new PSCell information; or
all stored PSCell entries corresponding to all earlier stored PCells except for a last plurality of PCells if the wireless device needs to store one PSCell entry corresponding to a more recent PCell; or
one or more stored PSCell entries corresponding to one or more earlier stored PCells of a certain PCell type if the wireless device needs to store one PSCell entry corresponding to a more recent PCell; or
all historical stored PSCell history information except for a most recent plurality of PCell entries upon performing a PCell handover and storing the latest PCell information; or
the oldest PSCell entry corresponding to the current PCell if the wireless device needs to store a new PSCell entry corresponding to the same PCell.

* * * * *